(12) United States Patent
Tokar

(10) Patent No.: US 6,210,469 B1
(45) Date of Patent: Apr. 3, 2001

(54) AIR FILTER ARRANGEMENT HAVING FIRST AND SECOND FILTER MEDIA DIVIDING A HOUSING AND METHODS

(75) Inventor: Joseph C. Tokar, Apple Valley, MN (US)

(73) Assignee: Donaldson Company, Inc., Minneapolis, MN (US)

( * ) Notice: Subject to any disclaimer, the term of this patent is extended or adjusted under 35 U.S.C. 154(b) by 0 days.

(21) Appl. No.: 09/259,022

(22) Filed: Feb. 26, 1999

(51) Int. Cl.[7] .............................. B01D 29/56; B01D 50/00
(52) U.S. Cl. ................................ 95/287; 55/319; 55/472; 55/480; 55/486; 55/489; 55/502; 55/521
(58) Field of Search .............................. 55/318, 319, 332, 55/321, 462, 467, 472, 480, 486, 489, 502; 95/286, 287

(56) References Cited

U.S. PATENT DOCUMENTS

| | | | |
|---|---|---|---|
| 2,093,082 | * | 9/1937 | Karlstrom ........................... 55/472 |
| 2,599,604 | | 6/1952 | Bauer et al. . |
| 2,794,513 | * | 6/1957 | Hultberg et al. .................... 55/472 |
| 2,890,796 | | 6/1959 | Blood . |
| 2,914,785 | | 12/1959 | Ela . |
| 3,025,963 | | 3/1962 | Bauer . |
| 3,209,917 | | 10/1965 | Yelinek . |
| 3,708,962 | * | 1/1973 | Deguchi et al. ................... 55/472 |
| 3,856,488 | * | 12/1974 | Kato et al. ........................ 55/472 |
| 3,912,631 | | 10/1975 | Turman . |
| 4,065,341 | | 12/1977 | Cub . |
| 4,255,175 | | 3/1981 | Wilkins . |
| 4,394,147 | | 7/1983 | Caddy et al. . |
| 4,545,794 | * | 10/1985 | Himukai ........................... 55/472 |
| 4,678,489 | | 7/1987 | Bertelsen . |
| 4,767,531 | | 8/1988 | Holzer . |
| 5,069,790 | | 12/1991 | Mordeki . |
| 5,211,846 | | 5/1993 | Kott et al. . |
| 5,472,463 | | 12/1995 | Herman et al. . |
| 5,536,290 | | 7/1996 | Stark et al. . |
| 5,601,717 | | 2/1997 | Villette et al. . |
| 5,820,646 | * | 10/1998 | Gillingham et al. .............. 55/488 |

FOREIGN PATENT DOCUMENTS

| | | |
|---|---|---|
| 43 40 292 A1 | 10/1995 | (DE) . |
| 0 329 364 A1 | 8/1989 | (EP) . |
| 0 385 260 A1 | 9/1990 | (EP) . |
| 0 558 091 A1 | 3/1993 | (EP) . |
| 1171615 | 7/1989 | (JP) . |
| WO 97/40917 | 11/1997 | (WO) . |

* cited by examiner

Primary Examiner—David A. Simmons
Assistant Examiner—Robert A. Hopkins
(74) Attorney, Agent, or Firm—Merchant & Gould P.C.

(57) ABSTRACT

A filter arrangement includes a housing having first and second stage regions of filtering. The air flows through an inlet and into a first chamber having a cross-sectional area larger than the inlet. The air expands and particles drop to the bottom of the chamber. The air then passes through the first stage filter media. Additional particles are trapped by the filter media and dropped to the bottom of the first chamber. The air then flows into a second chamber and then through a second stage filter arrangement. Additional particles are removed in the second stage filter arrangement. The air is then exhausted. One preferred application is in a shop-vacuum. Methods of cleaning air and changing out the filters are provided herein.

11 Claims, 3 Drawing Sheets

AIR FILTER ARRANGEMENT HAVING FIRST AND SECOND FILTER MEDIA DIVIDING A HOUSING AND METHODS

FIELD OF THE INVENTION

This disclosure relates generally to air cleaners. Specifically, this disclosure relates to air cleaners for use with vacuum filter apparatus and methods for cleaning air.

BACKGROUND OF THE INVENTION

Many machine shops or wood-working shops typically will include tools that produce dust or chips. For example, most wood shops will produce sawdust and chips as the workpiece is being machined. Sawdust can be produced from such operations as cutting, routing, sanding, turning, and many others.

Dust collection systems have been developed to draw the generated sawdust into a central collection system. One system that has been developed is a typical vacuum-type arrangement, or "shop vacuum."

Some shop vacuums do not achieve an acceptable level of air cleaning. Further, some shop vacs can clog very quickly due to the size of sawdust, etc. Improvements are desirable.

SUMMARY OF THE DISCLOSURE

In one aspect, the disclosure describes a filter arrangement comprising a housing having an inlet and an outlet. The inlet is for in taking particulate-laden air, and the outlet is for exhausting clean air. Preferably, a first chamber is in the housing downstream of the inlet. The first chamber is preferably for permitting expansion of particulate-laden air, and defines a particle collection chamber. Preferably, a second chamber is in the housing downstream of the first chamber. A first region of filtering media is preferably located between the first and second chambers. The first region of filtering media is for removing at least a portion of particles from the particulate-laden air and depositing the particles in the particle collection container. Preferably, a third chamber is located in the housing downstream from the second chamber. The third chamber defines a clean air plenum. A second region of filtering media is preferably oriented within the third chamber and downstream of the second chamber. The second region of filtering media is for removing at least a portion of the particles from the particulate-laden air.

In preferred embodiments, the filter arrangement is usable within a shop vacuum assembly. The shop vacuum assembly preferably includes a blower arrangement for directing air from the inlet, to the first chamber, through the first region of filter media, to the second chamber, through the second region of filter media, to the third chamber, and out through the outlet.

Methods for removing and replacing the filtering media are provided herein.

The disclosure also describes a method of cleaning air comprising directing particulate-laden air from an inlet into a first chamber having a greater cross-sectional area than the inlet. Next, the particulate-laden air is directed through a screen member over the first chamber to remove particles having a size greater than a pore size of the screen member. Next, the particulate-laden air is directed in a direction between about 60–120 degrees from the screen member through a region of filter media to remove additional particles from the particulate-laden air and to result in at least partially cleaned air. Next, the at least partially cleaned air is exhausted through an outlet.

DETAILED DESCRIPTION

Figure 1:
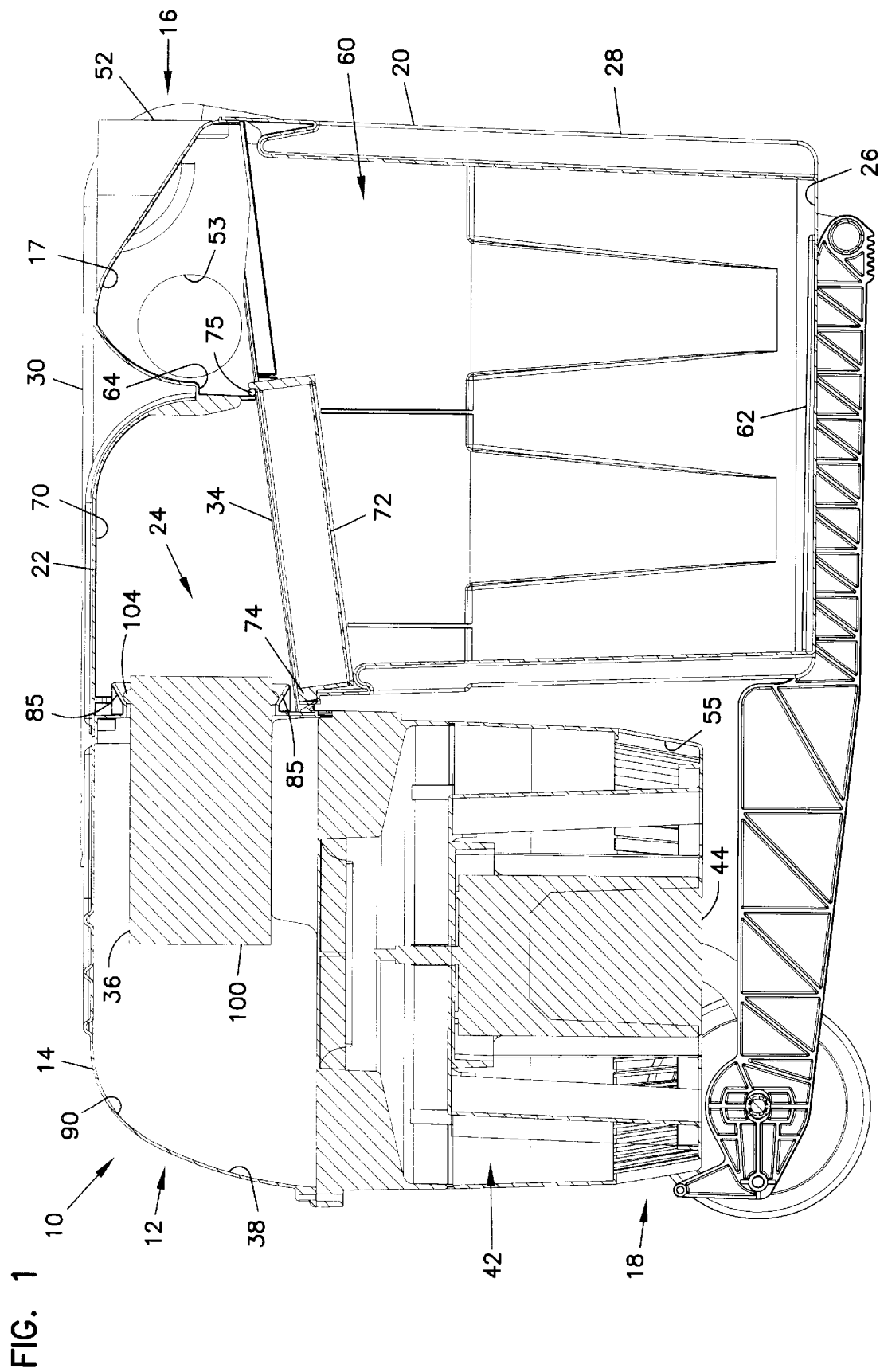
FIG. 1 is a schematic, cross-sectional view of an air cleaner, according to an example embodiment of the present invention.

Referring now to FIG. 1, a filter arrangement is shown generally at 10. Filter arrangement 10 operates as an air cleaner to filter or clean air including air having particulate-laden materials. In the specific example illustrated in FIG. 1, filter arrangement 10 is illustrated as a vacuum filter apparatus 12. Vacuum filter apparatus 12 is usable in shops, such as woodworking or metalworking shops for industrial or domestic use. While machine tools such as drills, sanders, mills, lathes, routers, and other machine tools generate dust such as sawdust and chips, the vacuum filter apparatus 12 is usable to draw in the air filled with sawdust or particles and clean the air of the sawdust and particles.

In general, vacuum filter apparatus 12 includes a housing 14. The housing 14 generally includes an inlet system 16, an outlet system 18, a bin 20, a lid arrangement 22, a filter system 24, and a blower apparatus 42.

In some systems, the bin 20 is removable and replaceable from the remaining portions of the housing 14. The bin 20 can be used for collecting and storing particulate matter, such as sawdust. Bin 20 generally includes a bottom wall 26 and a surrounding side wall 28.

Lid arrangement 22 generally includes a lid member 30. In certain systems, the lid member 30 is selectively removable from remaining portions of the housing 14, including the bin 20. For example, the lid member 30 may be hingedly attached to the rest of the housing 14. As will be explained in more detail below, the lid arrangement 22, in some systems, allows opening of the shop vacuum to expose the filter system 24.

In general, the filter system 24 is oriented adjacent to the bin 20. The filter system 24 is preferably for housing a first stage filter arrangement 34 and a second stage filter arrangement 36.

Downstream of the second stage filter arrangement 36 is the blower apparatus 42. The blower apparatus 42 is for drawing air through the overall air cleaner arrangement 10. For example, in certain embodiments, the blower apparatus 42 may include a fan powered by a motor 44 to induce vacuum pressure and draw particulate laden air through the inlet system 16, through the filter system 24, and out through the outlet system 18.

Still referring to FIG. 1, the inlet system 16 typically includes a plurality of inlet conduits. In the example shown in FIG. 1, there are two inlet conduits 52, 53 shown, and a third inlet conduit that is coaxially aligned with the inlet conduit 53.

The outlet system 18, in the embodiment shown in FIG. 1, includes a plurality of openings 55 around the periphery of the blower apparatus 42.

In general, the vacuum filter apparatus 12 can include conduits or hoses leading to the inlet system 16, such that air flows through the inlet system 16, into the bin 20, through the first stage filter 34, through the second stage filter 36, into a clean air plenum 38, and out through the outlet system 18.

Still referring to FIG. 1, a schematic, cross-sectional view of the filter arrangement 10 is depicted. In FIG. 1, the inlets 52, 53 can be seen. Particle-laden air is drawn in through the inlet system 16 and into the interior portions of the housing 14.

The particle-laden air flows from the inlet system 16 into an inlet chamber 17 and then into a first chamber 60. First chamber 60 defines a volume and a cross-sectional area that is larger than the volume and cross-sectional area of the inlet chamber 17. Because the first chamber 60 is downstream of the inlet system 16, air flows from the inlet chamber 17, a region of smaller cross-sectional area, and then into the first chamber 60, where it expands due to the larger cross-sectional area. As the air expands, the pressure decreases. The velocity of the particle-laden air slows down, and particles in the air tend to drop by gravity. The particles drop onto a bottom surface 62, where they collect for later disposal. As such, the first chamber 60 defines a particle collection container.

In the specific embodiment illustrated, the first chamber 60 corresponds, in this example, to the bin 20. The bottom wall 26 of the bin 20 functions as the bottom surface 62 in order to collect and hold particles and drop by gravity within the first chamber 60.

Preferably, the first chamber 60 has a cross-sectional area of about 3–5 times larger than the cross-sectional area of the inlet chamber 17. This allows the velocity of the particle-laden air to slow down by at least 70 percent, more preferably, about 85 percent.

Note the baffle member 64 at the end of the inlet chamber 17. The baffle 64 causes the incoming air to turn a corner, approximately 60–120 degrees, in order to enter the first chamber 60.

Still referring to FIG. 1, the first stage filter 34 is oriented immediately downstream of the first chamber 60. The first stage filter 34 is also oriented between the first chamber 60 and a second chamber 70. The first stage filter 34 acts as a coarse filter to remove large particles. As the particulate-laden air flows from the inlet system 16 and into the first chamber 60, although some of the particles will drop by gravity onto the bottom surface 62 of the first chamber 60, a portion of the particles may still remain carried by the air. These particles will encounter the first stage filter 34 and at least a portion of the particles will not be allowed to penetrate the first stage filter 34. Rather, the particles will drop to the bottom of the particle collection container defined by the bin 20.

In the preferred embodiment, the first stage filter 34 comprises a panel filter 72. The panel filter 72 is oriented across a top opening of the first chamber 60. The panel filter 72 is preferably removable and replaceable from the housing 14. Appropriate seal members 74 are oriented between the panel filter 72 and its holding structure on the housing 14. The seal member 74 creates a seal between the first chamber 60 and the second chamber 70 such that air is forced to pass through the panel filter 72. A seal member 75 is oriented between the panel filter 72 and the baffle 64, to create a seal between the inlet chamber 17 and the second chamber 70.

Figure 3:
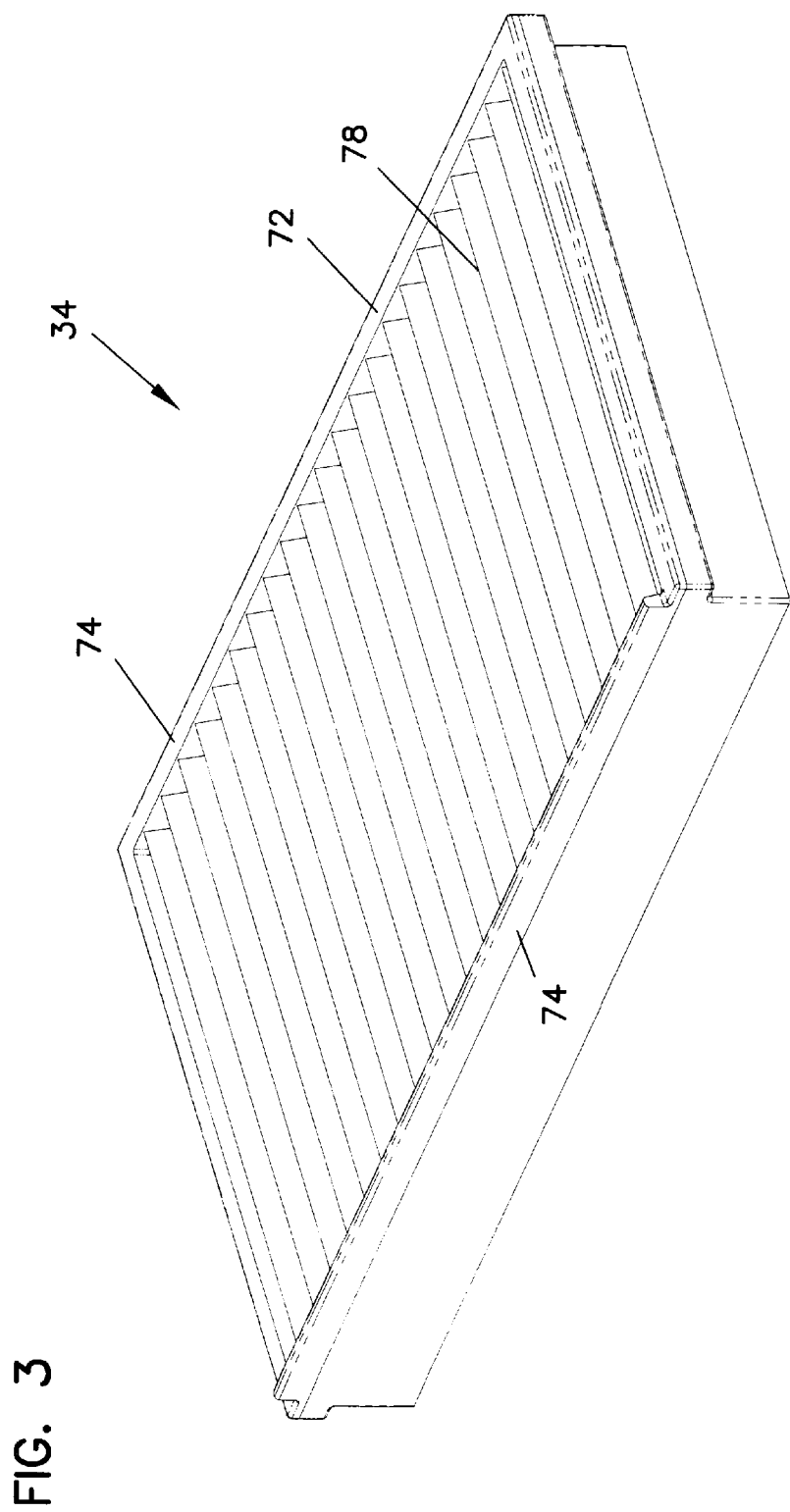
FIG. 3 is a schematic, perspective view of a first stage filter element usable in the air cleaner of FIG. 1, according to an example embodiment of the present invention.

Attention is directed to FIG. 3. In preferred arrangements, the panel filter 72 comprises a pleated screen 78. The pleated screen 78 would have about 15–30 pleats, for example, 22 pleats, and a metal mesh having a size of about 300–800 microns in. This will stop particles larger than about 300–800 microns from passing through.

Attention is again directed to FIG. 1. The second chamber 70 spans or forms a bridge between the first stage filter 34 and second stage filter 36. The second chamber 70 defines a cross-sectional area that is less than the cross-sectional area of the first chamber 60. The second stage filter 36 is oriented between the second chamber 70 and a third chamber 90. The third chamber 90 also defines the clean air plenum 38. Note that the baffle member 64 divides the inlet chamber 17 from the second chamber 70. In the preferred embodiment, the baffle member 64 also corresponds to a portion of the lid arrangement 22.

As air flows from the first chamber 60, through the panel filter 72, and into the second chamber 70, it then encounters the second stage filter arrangement 36. Preferably, the second stage filter arrangement 36 acts as a polishing filter to remove any remaining particles carried by the air that either did not drop by gravity in the first chamber 60 or were not removed by the first stage filter 34. The second stage filter arrangement 36 preferably removes particles of a size greater than at least 0.5 microns (smallest outermost dimension).

In the preferred embodiment, there is a single polishing filter. In other embodiments, there can be more than one polishing filter.

Figure 2:
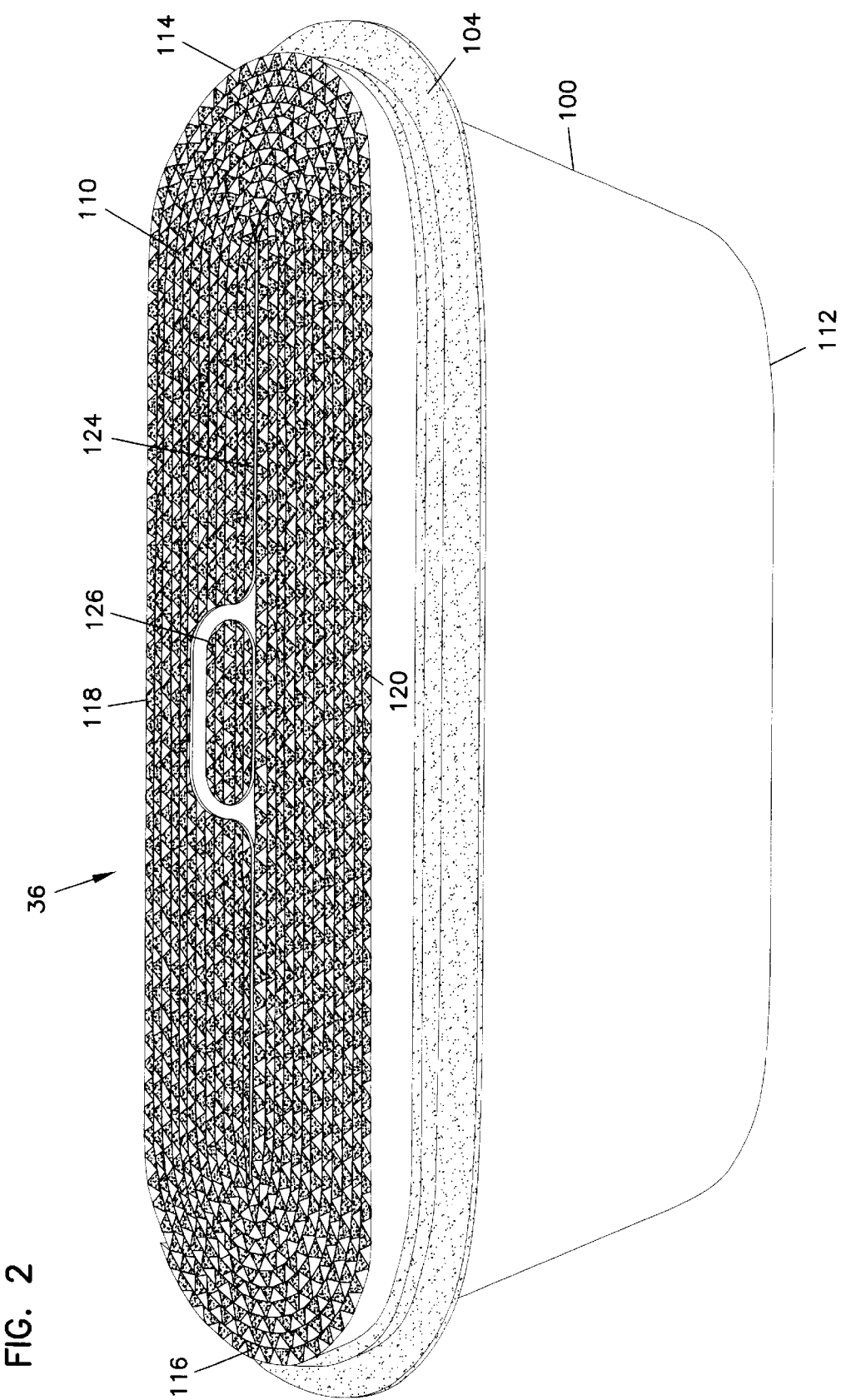
FIG. 2 is a schematic, perspective view of a second stage filter element usable in the air cleaner of FIG. 1, according to an example embodiment of the present invention.

Attention is directed to FIG. 2. In FIG. 2, the preferred second stage filter arrangement 36 is shown in perspective view. Preferably, the second stage filter arrangement 36 includes a single filter element 100. The filter element 100 includes an appropriate sealing member 104 secured to the outer periphery of the media in the element 100. The filter element 100 is preferably removable and replaceable in the housing 14. After a period of use, when the filter element 100 becomes occluded, the filter element 100 can be removed and replaced by hand with a new filter element 100. Alternatively, the filter element 100 may be cleaned and then re-installed in the housing 14.

Preferably, the filter element 100 comprises a spirally rolled, or coiled, corrugated cellulose media. More preferably, the filter element 100 includes a series of flutes, generally parallel, but in some instances, may be tapered. Each of the flutes has an upstream portion 110 and a downstream portion 112. Selected ones of the flutes have upstream portions open and downstream portions closed, while selected ones of the flutes have upstream portions closed and downstream portions open. In typical arrangements, alternating upstream portions 110 and downstream portions 112 of adjacent flutes are closed or sealed. Media constructions of this type are described in commonly assigned U.S. Pat. No. 5,820,646, incorporated herein by reference. Further, a media construction of this type is described in commonly assigned and co-pending U.S. patent application Ser. No. 09/258,481, pending patent, filed the same date herewith entitled, "Filter Element and Methods" and incorporated herein by reference.

Preferably, the filter element 100 defines a non-circular cross-section. More preferably, the filter element 100 defines an obround, or oval, or racetrack-shaped cross-section. Specifically, the element 100 includes opposite semicircular portions 114, 116 joined by a pair of straight segments 118, 120. This cross-sectional shape is convenient, in that in large surface area of filtering material may be fit into a relatively small volume of space. In certain preferred arrangements, the filter element 100 will have a media surface area of at least 30 $ft^2$, and typically about 50–150 $ft^2$. The filter element 100 has an overall volume of no greater than about 1000 $in^3$, and typically about 600–900 $in^3$.

In certain preferred embodiments, the second stage filter arrangement 36 will include as handle system for permitting a convenient removal and change out of the second stage filter arrangement 36. In general, the handle system will include handle structure or grasping members secured to the element 100 to permit a tension force to be applied to the element 100.

In the particular embodiment shown in FIG. 2, the handle system includes a grasping member secured to an inner core 124. The handle system can include pull rods, finger hooks, or ties, for example. In the particular embodiment illustrated in FIG. 2, the handle system includes an aperture 126 defined by the central core 124. In this manner, the aperture 126 projects above the upstream face 110 of the filter element 100. The aperture 126 accommodates a person's fingers or hand. In this manner, a person may grasp the handle system and pull the filter element 100 from the housing 14.

Note that the second stage filter arrangement 36 is housed in the third chamber 90 or clean air plenum 38. Also note that the first stage filter 34 and second stage filter arrangement 36 are in completely different chambers or plenums. The second stage filter arrangement 36 is isolated from the initial dirty air chamber 60. One way this is accomplished is by orienting the second stage filter arrangement 36 about 40–200 degrees, for example, about 60–120 degrees relative to the first stage filter 34. Preferably, the second stage filter arrangement 36 is about 70–100 degrees relative to the first stage filter 34. This allows for the first stage filter 34 and second stage filter arrangement 36 to be in completely different air plenums. This helps to collect the large particles in a chamber separate from the polishing filter elements 100.

Still referring to FIG. 1, note the path that airflow takes through the housing 14. The air flows through the inlet system 16 into the inlet chamber 17 and encounters baffle 64. The particle-laden air turns a corner, at about 90 degrees. The air then expands into the first chamber 60, where it slows down. Due to the decrease in velocity, large particles drop from the air to the bottom of the bin 20. The air then flows through the panel filter 72, where additional particles are removed. The air then encounters the top wall of the lid member 30 in the second chamber 70. It turns a corner, approximately 70–100 degrees, and travels through the second stage filter arrangement 36. After flowing through the second stage filter arrangement 36, the air flows to the third chamber 90, where the air has substantially been cleaned or removed of many of the particles having a size greater than at least about 0.5 micron. From the third chamber 90, the air turns another corner, about 90 degrees, and flows through the fan and is exhausted through the outlet system 18.

The above method of cleaning air will remove at least 99.9 percent, preferably about 99.999 percent of particles having a size greater than at least about 0.5 micron. The method should preferably remove at least 99.9 percent, preferably about 99.99 percent, of all particles having a size between about 0.5–10 microns.

In one preferred arrangement, the pressure drop across the panel 72 will be about 0.5 inches of water. The pressure drop across the second stage filter arrangement 36 will be about 1.0 inch of water. The preferred vacuum filter apparatus 12 will operate about 8 hours before replacement is needed of the first stage filter 34, and 80 hours before replacement is needed of the second stage filter arrangement 36, depending on the application. If sanding, finer dust is generated, and the first stage filter may need servicing after 2 hours; if sawing, coarser dust is generated, and the first stage filter may operate at least 10–20 hours before servicing is needed.

In certain types of arrangements, to change out the filter system 24, the lid member 30 is removed from the remaining portions of the housing 14. In other arrangements, the interior of the housing 14 is accessed through a port hole or access hole in the housing 14. The pleated screen 78 may be removed from the housing 14 and either replaced with a new pleated screen or cleaned and re-inserted in the housing 14. The filter element 100 may be removed from the housing 14 by grasping the handle 126 and pulling the handle 126 to break a seal between the filter element 100 and the housing 14. The element 100 may then be disposed and replaced with a new filter element 100. The new filter element 100 is inserted into the housing 100 so that the seal member 104 is wedged in the filter seat 85 of the housing 14 to create a seal between the clean air plenum 38 and the second chamber 70, thereby forcing air flow through the filter element 100. Alternatively, the original, first filter element 100, after removal, may be cleaned by vertically orienting the element 100 to point the flutes downward. The element 100 may be tapped or jiggled, to empty out any collected debris contained in the flutes. In addition, the element 100 may be cleaned while still in the housing 14 through a pulse-jet of compressed air, such as those described in U.S. Pat. No. 4,364,251, incorporated by reference herein. The cleaned filter element 100 may then be reinserted in the housing 14 in the manner described above.

The above specification, examples and data provide a complete description of the invention. Many embodiments of the invention can be made.

I claim:
1. A filter arrangement comprising:
  (a) a housing including a dirty airflow inlet and a clean airflow outlet;
    (i) said inlet defining a first cross-sectional area;
  (b) a first air expansion chamber in said housing downstream of said inlet; said first chamber defining a second cross-sectional area larger than said first cross-sectional area;
    (i) said first chamber defining a particle collection container;
  (c) a second chamber in said housing downstream of said first chamber; said second chamber having a third cross-sectional area smaller than said second cross-sectional area;
  (d) a first region of filtering media between said first and second chambers;
    (i) said first region of filtering media constructed and arranged to remove at least a portion of particles from the dirty airflow and deposit the particles in said particle collection container;
  (e) a third chamber in said housing downstream from said second chamber;
    (i) said third chamber defining a clean air plenum;
  (f) a second region of filtering media downstream of said second chamber;
    (i) said second region of filtering media being oriented within said third chamber;
    (ii) said second region of filtering media constructed and arranged to remove at least a portion of particles from the dirty air flow;
    (iii) said second region of filtering media comprising a removable and replaceable element of fluted media;
      (A) said fluted media comprising a plurality of flutes; each of said flutes having an upstream portion and a downstream portion;

(i) selected ones of said flutes having the upstream portion open and downstream portion closed, and selected ones of said flutes having the upstream portion closed and downstream portion open;

(iv) said second region of filtering media including a handle member projecting therefrom; said handle member secured to an inner core of said second region of filtering media;

(A) said handle member including a projection sized to be grasped by a human hand; and (v) said second region of filtering media including a seal member secured to an outer periphery thereof; said seal member forming a seal between said second and third chambers.

2. A filter arrangement according to claim 1 wherein:

(a) said second region of filtering media is oriented 60–120 degrees relative to said first region of filtering media.

3. A filter arrangement according to claim 2 wherein:

(a) said first region of filtering media comprises a removable and replaceable panel filter having a pleated screen.

4. A filter arrangement according to claim 3 wherein:

(a) said pleated screen is sized to remove particles greater than a size of about 300 microns.

5. A filter arrangement according to claim 2 wherein:

(a) said second region of filtering media has a race-track shaped cross-section.

6. A filter arrangement according to claim 2 further including:

(a) a baffle member between said inlet and said second chamber.

7. A filter arrangement according to claim 6 wherein:

(a) said inlet is oriented 60–120 degrees relative to said first chamber.

8. A filter arrangement according to claim 7 further including:

(a) a blower apparatus oriented between said third chamber and said outlet.

9. A filter arrangement according to claim 1 wherein:

(a) said handle member is a finger hook.

10. A method of servicing a vacuum filter apparatus comprising:

(a) accessing a vacuum filter housing to expose first and second filter elements;

(i) the second filter element comprising a removable and replaceable element of fluted media:

(a) the fluted media comprising a plurality of flutes; each of the flutes having an upstream portion and a downstream portion; selected ones of the flutes having the upstream portion open and downstream portion closed, and selected ones of the flutes having the upstream portion closed and downstream portion open;

(b) removing the first filter element from the housing;

(c) grasping a handle member on the second filter element and pulling the handle to break a seal between the second filter element and the housing; the handle member secured to an inner core of said second filter element and sized to be gripped by a human hand; and (d) removing the second filter element from the housing.

11. A method according to claim 10 including:

(a) said step grasping a handle member includes grasping a finger hook.

* * * * *